April 5, 1966  A. AMBLI  3,244,432
MUD FLAP FRAME
Filed Oct. 13, 1964
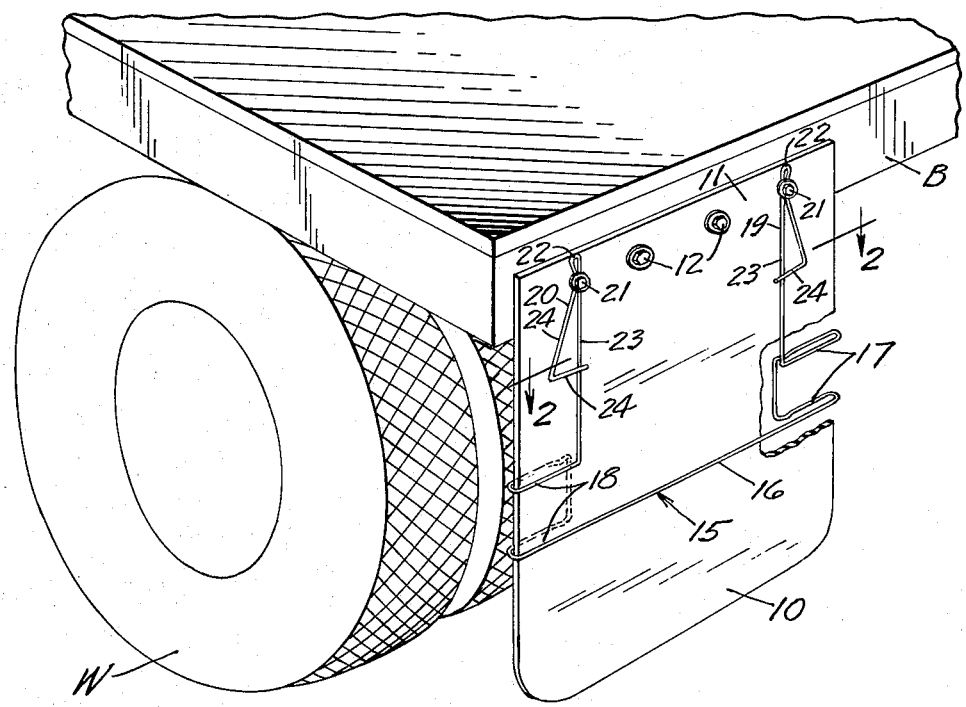
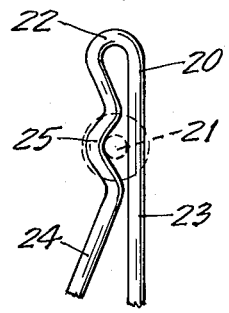
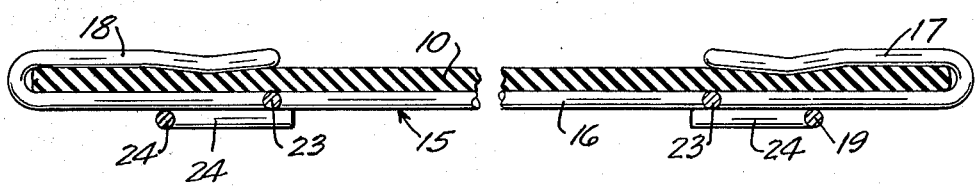
INVENTOR
ANDREW AMBLI
BY
Williamson & Palmatier
ATTORNEYS

United States Patent Office 3,244,432
Patented Apr. 5, 1966

3,244,432
MUD FLAP FRAME
Andrew Ambli, 2376 N. Hamline Ave., St. Paul, Minn.
Filed Oct. 13, 1964, Ser. No. 403,452
3 Claims. (Cl. 280—154.5)

This invention relates to a frame attachable to a vehicle body along with a mud flap for stiffening the mud flap and preventing flapping thereof.

In most areas, the use of mud flaps on trucks is required by law, and in many areas, the law requires that mud flaps be restricted from swinging or flapping rearwardly under influence of wind to an extent more than just a few degrees from the vertical.

An object of my invention is to provide a new and improved frame for vehicle mud flap as to resist rearward swinging and flapping of the mud flap.

Another object of my invention is to provide a rod type frame attachable adjacent the upper edge of a mud flap to the vehicle frame by means of mounting bolts which also attach the mud flap to the vehicle body and having a lower rod portion which is attachable to the mud flap sheet material and which frame also bows substantially uniformly between top and bottom to minimize localized flexing and flapping of the frame and mud flap.

These and other objects and advantages of my invention will more fully appear from the following description made in connection with the accompanying drawings, wherein like reference characters refer to the same or similar parts throughout the several views, and in which:

FIG. 1 is a perspective view of the invention applied to a conventional mud flap on a vehicle body;

FIG. 2 is an enlarged detailed section, partly broken away and taken approximately at 2—2 in FIG. 1;

FIG. 3 is an enlarged detail elevation view of a portion of the frame construction shown detached from the flap and vehicle body.

One form of the invention is shown in the drawings and is described herein. A portion of the vehicle body B is illustrated in the drawing and the usual dual wheels W of a vehicle or truck. A mud flap 10 is shown suspended from its upper edge portion 11 and which the mud flap is attached as by bolts 12 to the vehicle body B in a somewhat conventional fashion. The mud flap 10 is constructed of heavy gauge rubber sheet material which is highly flexible and is extremely tough as to withstand the rather rough treatment that the mud flap is constantly exposed to, caused by flying rocks and debris, along with wind and water.

The frame is indicated in general by numeral 15 and is constructed of substantially rigid rod material which may be carbon steel and which may be approximately seven-thirty-seconds of an inch in diameter. The frame 15 is of integral and one piece construction and, although the rod material in the frame is substantially rigid, it will be understood that the rod will flex or bow to some degree when pressure is applied. The frame has a lower portion 16 for engaging the lower portion of the flap 10 and preventing the flap from swinging rearwardly or flapping considerably under influence of the wind. The lower portion 16 of the frame has a pair of substantially U-shaped gripping portions 17 and 18 respectively disposed adjacent opposite side edges of the mud flap 10 for receiving and gripping these side edges of the mud flap and preventing separation of the mud flap from the frame. It will be noted that the U-shaped portions 17 and 18 grip the mud flap 10 tightly as to restrict sliding of the edge portions of the flap in the U-shaped portions 17 and 18 of the frame.

The end portions 19 and 20 of the frame are disposed generally upwardly from the lower portion 16 and adjacent the upper edge portion 11 of the mud flap 10 to facilitate mounting of the frame 15 on the mounting bolts 21 which also serve to attach the mud flap to the vehicle body B.

The upper end portions 19 and 20 of the frame are substantially identical to each other and have top loops 22 and depending first and second rod portions 23 and 24 extending downwardly therefrom. The first rod portion 23 extends directly downwardly from the loop 22 to the lower portion of the frame at which point the mud flap 10 is gripped. The second rod portion 24 extends downwardly along and in juxtaposed relation with the first rod portion 23 and has a detent 25 formed therein for forming a mounting bolt receiving space facilitating clamping by the mounting bolt 21 of the rod portions 24 and 23.

The second rod portion 24 also extends downwardly from the detent 25 in a direction obliquely outwardly from the first rod portion 23 and then transversely inwardly and across the rod portion 23 and in engagement therewith and at the rear side of the rod portion 23. This prevents any substantial bending or kinking of the rod portion 23 at a location immediately adjacent the mounting bolt 21 and essentially produces a bowing of the rod portion 23 along a substantial portion of its length and under influence of the wind acting on the mud flap 10 so as to prevent breaking of the frame.

In use, the frame 15 is attached at the rear side of the mud flap 10 substantially as illustrated and by means of the same mounting bolts 21 that are also used to secure the mud flap to the vehicle body. Of course washers may be used to increase the area of engagement with the upper portions 19 and 20 of the frame 15. When the vehicle is moved at a rapid rate along the highway, the wind will act upon the mud flap 10, attempting to swing the mud flap rearwardly through a substantial angle and to cause flapping thereof, however the frame 15 which grips the side edges of the mud flap prevents any substantial rearward swinging or flapping of the mud flap and the depending first end rod portion 24 which extends transversely across the depending rod portion 23 produces a stiffening of the rod portion 23 in a manner as to cause bowing of the rod portion 23 substantially along its entire length. The frame 15 will thereupon be prevented from sharply bending and will have a long life.

It will, of course, be understood that various changes may be made in the form, details, arrangement and proportions of the various parts without departing from the scope of my invention.

What is claimed is:

1. A frame attachable to a vehicle body for stiffening and minimizing flapping of a mud flap of the type constructed of flexible sheet material and being attachable along its upper edge portion to the vehicle body as by mounting bolts to face in forward and rearward directions, said frame having a lower portion with means attachable to a lower portion of the mud flap to restrict flapping thereof, said frame also having spaced upper portions to be disposed adjacent the upper edge portion of said mud flap, each of said upper portions of the frame having a top loop and juxtaposed first and second rod portions depending from the loop for receiving a mounting bolt therebetween and to be clamped to the vehicle frame, said first rod portion extending downwardly to said lower portion of the frame, said second rod portion extending downwardly along said first rod portion and then transversely across and to the rear of said first rod portion to cooperate therewith in preventing rearward movement of the flexible mud flap and lower frame portion and also to cooperate therewith in maximizing the length of said second portion which is bowed under influence of the wind acting against the mud flap.

2. A frame attachable to a vehicle body for stiffening and minimizing flapping of a mud guard of the type constructed of flexible sheet material and being attachable along its upper edge portion to the vehicle body as by mounting bolts to face in forward and rearward directions, said frame being constructed of substantially rigid rod material and having a lower portion with means attachable to a lower portion of the mud flap to restrict flapping thereof, said frame also having spaced upper end portions to be disposed at the rear side of the mud flap adjacent the upper edge portion thereof, each of said upper portions of the frame having a top loop and juxtaposed first and second rod portions depending from the loop for receiving a mounting bolt therebetween and to be clamped to the vehicle frame, said first rod portion extending downwardly to said lower portion of the frame, said second rod portions extending downwardly and transversely outwardly from said first rod portion and then transversely across and to the rear of said first rod portion and in engagement therewith to cooperate with said first rod portion in preventing rearward movement of the mud flap and lower frame portion and also to cooperate therewith in maximizing the length of said second portion which is bowed under influence of the wind acting against the mud flap.

3. The frame set forth in claim 2, wherein said second rod portions are substantially parallel with each other to extend substantially vertically, and said first rod portions extending obliquely downwardly and divergently outwardly from said first rod portions and then substantially normal to said first rod portions and transversely thereacross at the rear of said first rod portions and in engagement therewith to prevent the mud flap from holding along said first rod portion and swinging rearwardly with respect thereto.

References Cited by the Examiner
UNITED STATES PATENTS 3,059,945   10/1962   Robb _____ 280—154.5
3,091,478   5/1963    Ambli _____ 280—154.5

BENJAMIN HERSH, *Primary Examiner.*

W. A. MARCONTELL, *Assistant Examiner.*